United States Patent
Zhang et al.

(10) Patent No.: US 12,143,995 B2
(45) Date of Patent: Nov. 12, 2024

(54) MULTIPLEXING UPLINK CONTROL INFORMATION (UCI) ON PHYSICAL UPLINK SHARED CHANNEL (PUSCH)

(71) Applicant: Apple Inc., Cupertino, CA (US)

(72) Inventors: Wenshu Zhang, Santa Clara, CA (US); Weidong Yang, San Diego, CA (US); Fangli Xu, Beijing (CN); Wei Zeng, Saratoga, CA (US); Dawei Zhang, Saratoga, CA (US); Chunhai Yao, Beijing (CN); Yushu Zhang, Beijing (CN); Oghenekome Oteri, San Diego, CA (US); Seyed Ali Akbar Fakoorian, San Diego, CA (US); Sigen Ye, Whitehouse Station, NJ (US); Ralf Rossbach, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,245

(22) PCT Filed: Jan. 14, 2021

(86) PCT No.: PCT/CN2021/071903
§ 371 (c)(1),
(2) Date: Sep. 20, 2021

(87) PCT Pub. No.: WO2022/151249
PCT Pub. Date: Jul. 21, 2022

(65) Prior Publication Data
US 2023/0362937 A1    Nov. 9, 2023

(51) Int. Cl.
*H04W 72/21* (2023.01)
*H04L 5/00* (2006.01)
*H04W 72/566* (2023.01)
*H04W 72/23* (2023.01)

(52) U.S. Cl.
CPC .......... *H04W 72/21* (2023.01); *H04L 5/0053* (2013.01); *H04W 72/569* (2023.01); *H04W 72/23* (2023.01)

(58) Field of Classification Search
CPC . H04W 72/02; H04W 72/04; H04W 72/0446; H04W 72/121; H04W 72/23; H04W 72/50; H04W 72/51; H04W 72/52; H04W 72/53; H04W 72/54; H04W 72/541; H04W 72/542; H04W 72/543; H04W 72/56
See application file for complete search history.

(56) References Cited

U.S. PATENT DOCUMENTS

| 2019/0037586 A1 | 1/2019 | Park et al. |
| 2021/0045143 A1 | 2/2021 | Ji et al. |

(Continued)

FOREIGN PATENT DOCUMENTS

WO    WO 2020/051152 A1    3/2020

OTHER PUBLICATIONS

International Search Report for Application No. PCT/CN2021/071903 mailed Sep. 28, 2021, 6 pages.

(Continued)

*Primary Examiner* — Bo Hui A Zhu
(74) *Attorney, Agent, or Firm* — Sterne, Kessler, Goldstein & Fox P.L.L.C.

(57) ABSTRACT

Some aspects of this disclosure relate to apparatuses and methods for implementing techniques for a user equipment (UE) to transmit a configured grant (CG) physical uplink shared channel (PUSCH) including an uplink control information (UCI) without transmitting a physical uplink control channel (PUCCH). The UE determines, based on a configuration received from the base station, a first set of CG PUSCHs. Each CG PUSCH of the first set of CG PUSCHs overlaps with the PUCCH, and is configured to transmit data from the UE to the base station. The UE further determines a second set of CG PUSCHs by excluding a third set of CG PUSCHs from the first set of CG PUSCHs. and select a CG (Continued)

PUSCH from the second set of CG PUSCHs to carry the UCI contained in the PUCCH. The UE further transmits the selected CG PUSCH including the UCI without transmitting the PUCCH.

16 Claims, 6 Drawing Sheets

(56) References Cited

U.S. PATENT DOCUMENTS

2021/0058952 A1* 2/2021 Li .................. H04W 72/1268
2022/0053552 A1  2/2022 Li
2022/0141817 A1* 5/2022 Gao ................... H04L 1/1864
                                                            370/330

OTHER PUBLICATIONS

CATT Correction on PUSCH selection for overlapping of PUCCH and PUSCH 3GPP TSG-RAN WG1 Meeting #96bis R1-1904538, Apr. 12, 2019, 5 pages.
Moderator (vivo), "Summary of email discussion [103-e-NR-7.1CRs-08]-phase-2," R1-2009774, 3GPP TSG RAN WG1 #103-e, e-Meeting, Oct. 26-Nov. 13, 2020; 15 pages.
ETRI, "Pusch enhancements for URLLC," R1-1907042, 3GPP TSG RAN WG1 Meeting #97, Reno, USA, May 13-17, 2019; 7 pages.
Office Action for Japanese Patent Application No. 2023-542598, dated Jun. 27, 2024, Japanese Patent Office, Tokyo, Japan; 10 pages including English-language translation.

* cited by examiner

MULTIPLEXING UPLINK CONTROL INFORMATION (UCI) ON PHYSICAL UPLINK SHARED CHANNEL (PUSCH)

This application is a U.S. National Phase of International Application No. PCT/CN2021/071903, filed Jan. 14, 2021, which is hereby incorporated by reference in its entirety.

BACKGROUND

Field

The described aspects generally relate to multiplexing uplink control information (UCI) on physical uplink shared channel (PUSCH).

Related Art

The 3rd Generation Partnership Project (3GPP) has developed a new radio-access technology known as fifth generation (5G) New Radio (NR). Physical uplink control channel (PUCCH) is an uplink physical channel that carries uplink control information (UCI) from a user equipment (UE) to a base station. 5G NR PUCCH is flexible in time domain and frequency domain. Physical uplink shared channel (PUSCH) is a main uplink channel used to carry uplink user data from the UE to the base station. When a PUSCH is configured or granted, but the UE does not have proper user data to be transmitted, the PUSCH can be skipped or dropped if uplink skipping is enabled. However, simply skipping a granted PUSCH may cause reliability or complexity issues.

SUMMARY

Some aspects of this disclosure relate to apparatuses and methods for implementing techniques for a user equipment (UE) to multiplex uplink control information (UCI) on a physical uplink shared channel (PUSCH) for uplink transmission from a user equipment (UE) to a base station. UCI is normally transmitted by a physical uplink control channel (PUCCH), and a PUSCH is used to carry user data. When there is no proper user data to be transmitted, a granted PUSCH can be dropped or skipped without making any transmission from the UE if uplink skipping is enabled. When a PUCCH overlaps with a PUSCH, the UCI supposed to be carried by the PUCCH can be multiplexed and transmitted by the PUSCH without transmitting the PUCCH. There can be multiple PUSCHs overlapping with a PUCCH. In such situations, even without the proper user data, the PUSCH can be transmitted instead of being skipped to improve the efficiency and/or reduce the base station complexity in terms of decoding hypotheses. Solutions are needed to select an overlapping PUSCH among the multiple PUSCHs to carry the UCI of the PUCCH. A PUSCH can be a configured grant PUSCH or a dynamic grant PUSCH.

Some aspects of this disclosure relate to a UE. The UE can include a transceiver configured to wirelessly communicate with a base station, and a processor communicatively coupled to the transceiver. The processor of the UE is configured to identify a PUCCH configured to carry an UCI. In addition, the processor is configured to determine, based on a configuration received from the base station, a first set of configured grant PUSCHs. Each configured grant PUSCH of the first set of configured grant PUSCHs overlaps with the PUCCH, and is configured to transmit data from the UE to the base station. In some examples, the first set of configured grant PUSCHs can includes a configured grant type 1 PUSCH based on the configuration provided by radio resource control (RRC) configuration signaling, or a configured grant type 2 PUSCH based on the configuration provided by a physical downlink control channel (PDCCH).

According to some aspects, the processor is further configured to determine a second set of configured grant PUSCHs by excluding a third set of configured grant PUSCHs from the first set of configured grant PUSCHs. In some examples, the third set of configured grant PUSCHs excluded from the first set of PUSCHs comprises a configured grant PUSCH including a symbol colliding with a semi-static downlink (DL) symbol, a DL symbol as indicated by a dynamic downlink control information (DCI), or a flexible symbol indicated by a slot format indicator.

Afterwards, the processor is configured to select a configured grant PUSCH from the second set of configured grant PUSCHs to carry the UCI contained in the PUCCH. The processor can be configured to select the configured grant PUSCH from the second set of configured grant PUSCHs based on an index of the configured grant PUSCH, a logical channel priority for data mapped to the configured grant PUSCH, or a transmission duration of the configured grant PUSCH. In some examples, the processor can be configured to select, from the second set of configured grant PUSCHs, the configured grant PUSCH that has a smallest index of each configured grant PUSCH, a highest logical channel priority for data mapped to each configured grant PUSCH, or a shortest transmission duration of each configured grant PUSCH. In some other examples, the processor can be configured to operate a medium access control (MAC) layer to select the configured grant PUSCH from the second set of configured grant PUSCHs.

According to some aspects, the processor can be further configured to determine that there is no dynamic grant PUSCH overlapping with the PUCCH or with the selected configured grant PUSCH. Additionally and alternatively, the processor can be configured to determine that there is a dynamic grant PUSCH overlapping with the selected configured grant PUSCH, and a downlink control information (DCI) for the dynamic grant PUSCH is received at a time instance separated from a starting point of the PUCCH and a starting point of the selected configured grant PUSCH by less than a predetermined time interval.

According to some aspects, the selected configured grant PUSCH can carry the UCI of the PUCCH. In addition, the selected configured grant PUSCH can carry data generated by a logical channel (LCH) of a MAC layer to be transmitted to the base station. In some examples, the data is selected from a LCH of the MAC layer without meeting a preconfigured condition for mapping the LCH to the selected configured grant PUSCH. For example, the LCH of the MAC layer does not meet the preconfigured condition on an allowed subcarrier spacing index value, on a PUSCH transmission duration, on a configured grant type, on a cell information, on a configured grant index, or on a priority index.

According to some aspects, the processor can be further configured to transmit the selected configured grant PUSCH including the UCI, and possibly the data generated by the LCH. Hence, the UCI is multiplexed with data from a LCH satisfying preconfigured conditions, or from a LCH that does not meet a preconfigured condition. Accordingly, the PUCCH can be skipped.

Some aspects of this disclosure relate to a method performed by a UE. The method includes determining a PUCCH configured to carry an UCI to be transmitted to a base station. The method further includes determining, based on a configuration received from the base station, a first set of configured grant PUSCHs. Each configured grant PUSCH of the first set of configured grant PUSCHs overlaps with the PUCCH, and is configured to transmit data from the UE to the base station. Afterwards, the method includes determining a second set of configured grant PUSCHs by excluding a third set of configured grant PUSCHs from the first set of configured grant PUSCHs, and selecting a configured grant PUSCH from the second set of configured grant PUSCHs to carry the UCI contained in the PUCCH. Furthermore, the method includes transmitting the selected configured grant PUSCH including the UCI without transmitting the PUCCH.

Some aspects of this disclosure relate to non-transitory computer-readable medium storing instructions. When executed by a processor of a UE, the instructions stored in the non-transitory computer-readable medium cause the UE to perform various operations. The operations include determining a PUCCH configured to carry an UCI to be transmitted to a base station. The operations further include determining, based on a configuration received from the base station, a first set of configured grant PUSCHs. Each configured grant PUSCH of the first set of configured grant PUSCHs overlaps with the PUCCH, and is configured to transmit data from the UE to the base station. The operations also include determining a second set of configured grant PUSCHs by excluding a third set of configured grant PUSCHs from the first set of configured grant PUSCHs, and selecting a configured grant PUSCH from the second set of configured grant PUSCHs to carry the UCI contained in the PUCCH. Furthermore, the operations include transmitting the selected configured grant PUSCH including the UCI without transmitting the PUCCH.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
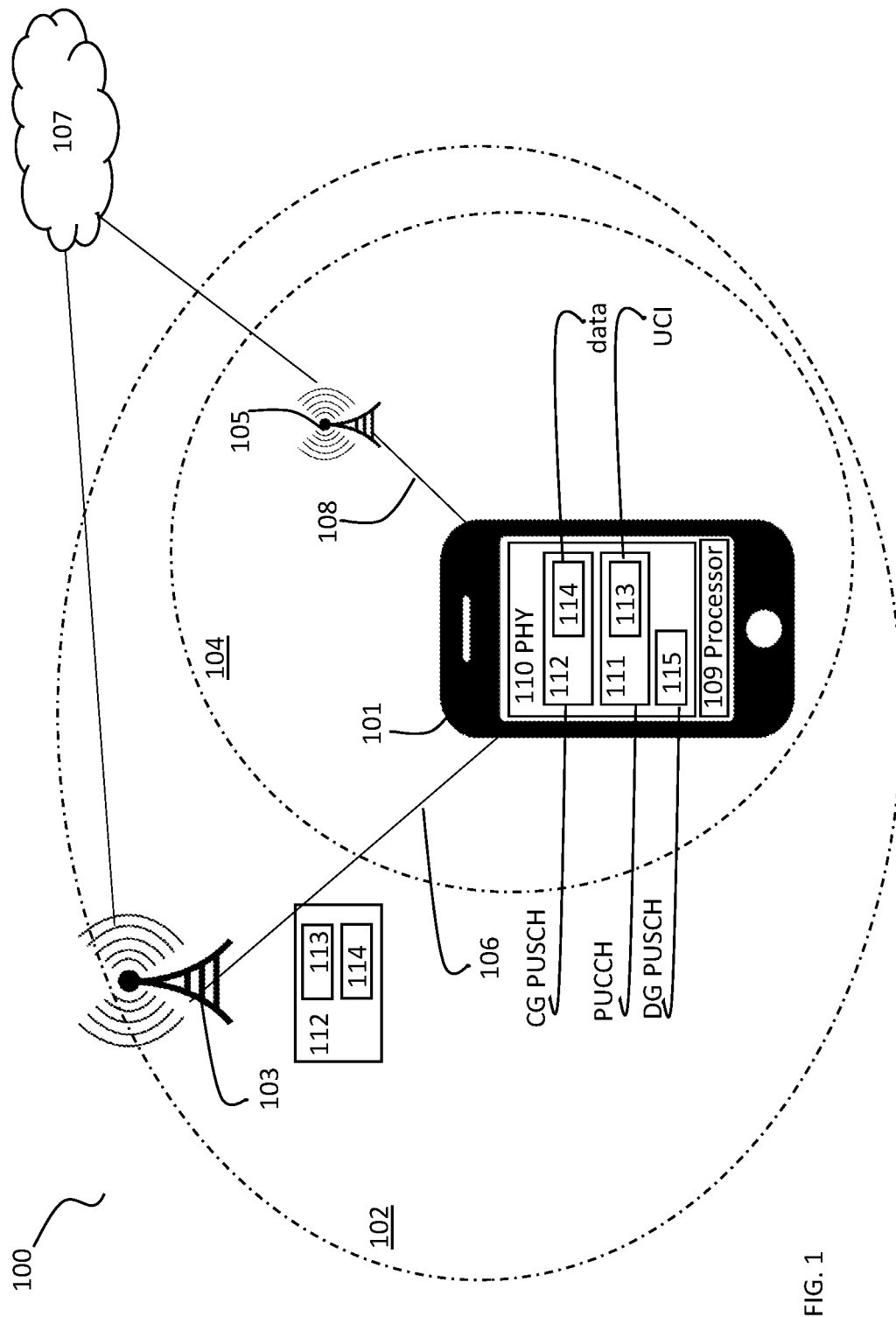
FIG. 1 illustrates a wireless system including a user equipment (UE) to transmit a configured grant physical uplink shared channel (PUSCH) including an uplink control information (UCI) without transmitting a physical uplink control channel (PUCCH), according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

In a wireless system, e.g., a fifth generation (5G) New Radio (NR) system, a physical uplink control channel (PUCCH) can be used to carry uplink control information (UCI) from a user equipment (UE) to a base station, while a physical uplink shared channel (PUSCH) can be used to carry user data from the UE to the base station. When a PUSCH is granted, but the UE does not have proper user data to be transmitted, the PUSCH can be skipped or dropped if uplink skipping is enabled. However, when a PUSCH overlaps with a PUCCH, the UCI included in the PUCCH can be multiplexed into the PUSCH, and the PUSCH is not skipped. Instead, the PUCCH is not transmitted. In Rel-16, the determination of which PUSCH the UCI is multiplexed on occurs before the UE knows whether there is any useful data available to be mapped to the PUSCH. With this deterministic UE behavior, the base station knows which PUSCH the UCI is multiplexed on if there are multiple PUSCHs overlapping with PUCCH, and avoids the need to perform different hypotheses for each PUSCH assuming the UCI is multiplexed on it or is not multiplexed on it.

A PUSCH can be dynamically scheduled as a dynamic grant (DG) PUSCH by an UL grant in a DCI, or a configured grant (CG) Type 1 or Type 2. The CG PUSCH Type 1 can be semi-statically configured to operate upon the reception of higher layer parameter of configuredGrantConfig including rrc-ConfiguredUplinkGrant without the detection of an UL grant in a DCI. The CG PUSCH Type 2 can be semi-persistently scheduled by an UL grant in a valid activation DCI after the reception of higher layer parameter configuredGrantConfig not including rrc-ConfiguredUplinkGrant. For a CG PUSCH, the parameters applied for the transmission are provided by configuredGrantConfig except for dataScramblingIdentityPUSCH, txConfig, codebookSubset, maxRank, scaling of (CI-OnPUSCH, which are provided by pusch-Config. Upon detection of a DCI scheduling a DG PUSCH, UE 101 can transmit the corresponding DG PUSCH unless the UE does not generate a transport block, and there is no PUCCH with CSI/HARQ-ACK that overlaps in time with the DG PUSCH. In some examples, when a DG PUSCH overlaps with a CG PUSCH, the CG PUSCH can be dropped or without being transmitted. When there are multiple CG PUSCHs and DG PUSCHs overlapping with a PUCCH, a mechanism can be developed herein to select a CG PUSCH or a DG PUSCH to transmit the UCI included in the PUCCH, and the PUCCH can be skipped. The mechanism presented in this disclosure can select a CG PUSCH or a DG PUSCH after the UE knows whether or not there is any proper data available to be mapped to the PUSCH.

Some aspects of this disclosure provide mechanisms to select a CG PUSCH from a set of CG PUSCHs to carry the UCI contained in the PUCCH, and transmit the selected CG PUSCH including the UCI without transmitting the PUCCH. In some examples, there can be no DG PUSCH overlapping with the PUCCH or with the selected CG PUSCH. In some other examples, there can be a DG PUSCH that overlaps with the selected CG PUSCH, but a DCI for the DG PUSCH is received at a time instance separated from a starting point of the selected CG PUSCH less than a predetermined time interval.

According to some aspects, a UE can determine, based on a configuration received from the base station, a first set of CG PUSCHs, where each CG PUSCH of the first set of CG PUSCHs overlaps with the PUCCH. The UE can determine a second set of CG PUSCHs by excluding a third set of CG PUSCHs from the first set of CG PUSCHs. A CG PUSCH can be excluded when the CG PUSCH includes a symbol colliding with a semi-static DL symbol, a DL symbol as indicated by a dynamic DCI, or a flexible symbol indicated by a slot format indicator. Furthermore, a CG PUSCH can be selected from the second set of CG PUSCHs based on an index of the CG PUSCH, a logical channel priority for data mapped to the CG PUSCH, or a transmission duration of the CG PUSCH.

Figure 2:
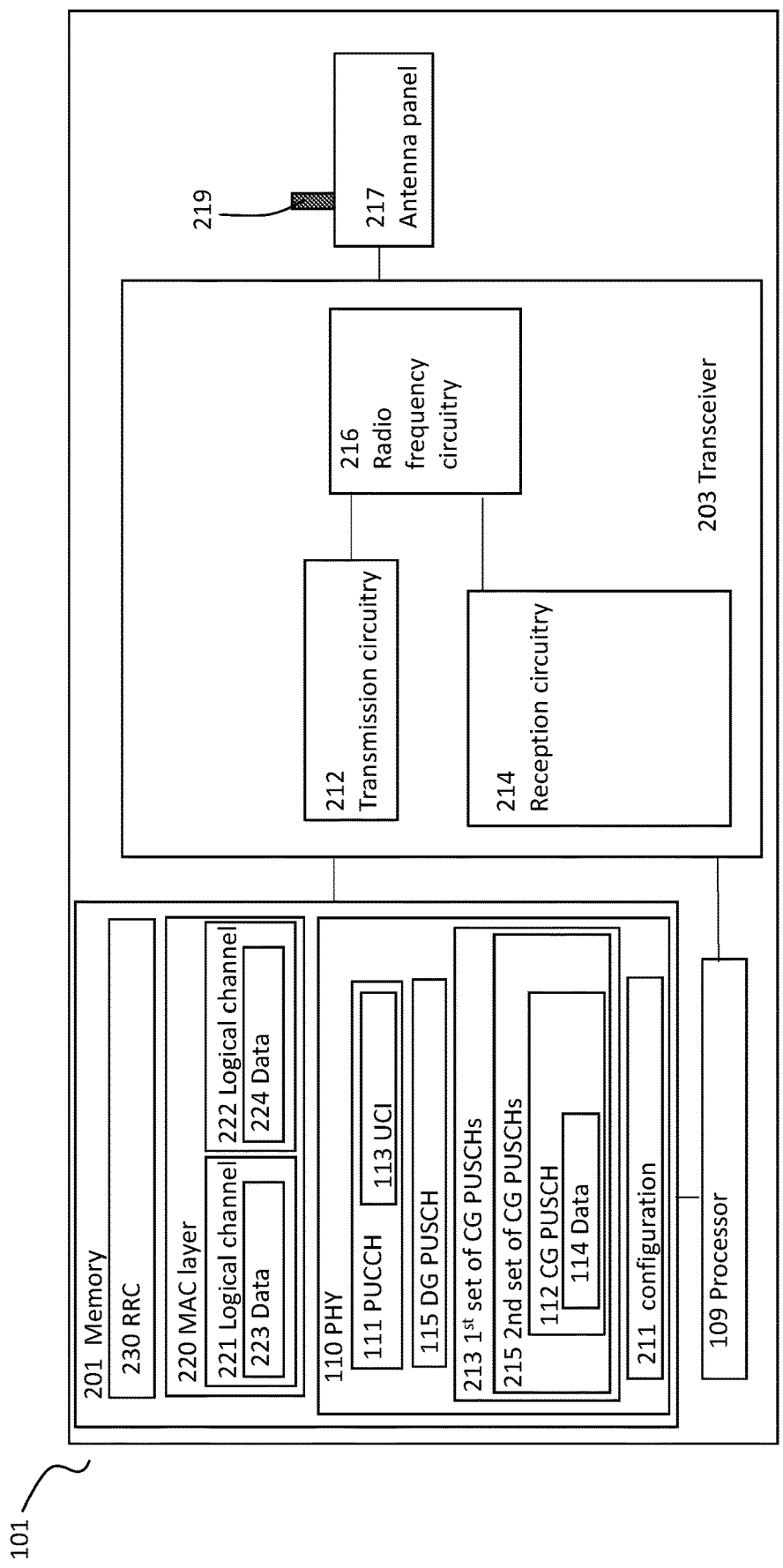
FIG. 2 illustrates a block diagram of a UE to perform functions described herein, according to some aspects of the disclosure.
Figure 3B:
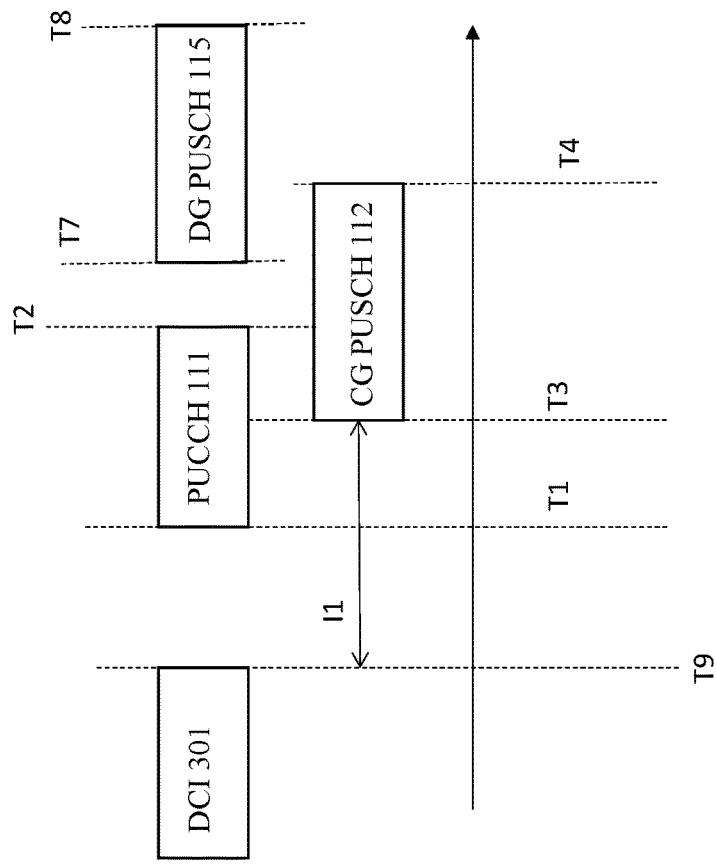
FIG. 3A-3B illustrate examples of relationships between a configured grant PUSCH, a dynamic grant PUSCH, and a PUCCH, according to some aspects of the disclosure.
Figure 3A:
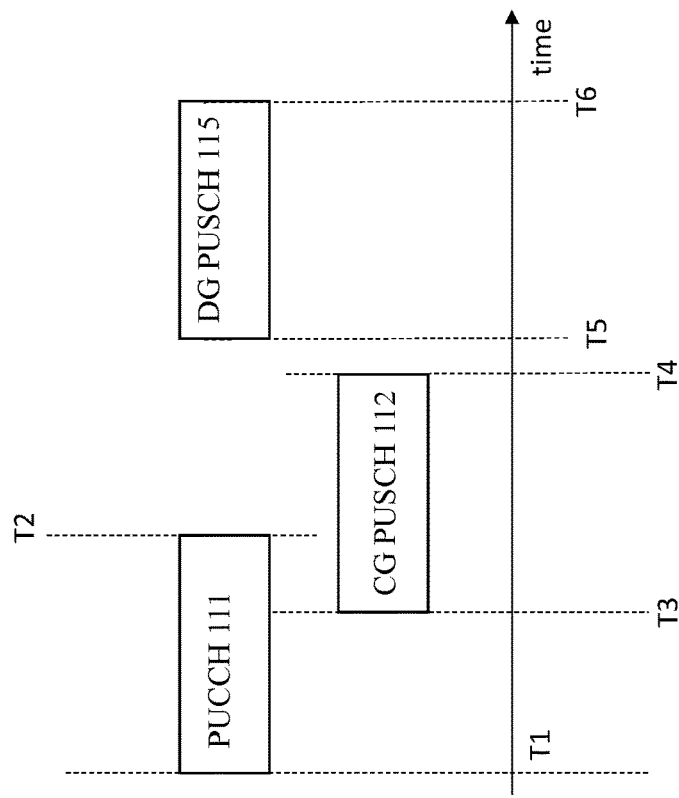

FIG. 1 illustrates a wireless system 100 including a UE, e.g., UE 101, to transmit a CG PUSCH including an UCI without transmitting a PUCCH, according to some aspects of the disclosure. FIG. 2 illustrates a block diagram of a UE, e.g., UE 101, to perform functions described herein, according to some aspects of the disclosure. FIG. 3A-3B illustrate examples of relationships between a CG PUSCH, a DG PUSCH, and a PUCCH, according to some aspects of the disclosure. Wireless system 100 is provided for the purpose of illustration only and does not limit the disclosed aspects. Wireless system 100 can include, but is not limited to, UE 101, base station 103, and a base station 105, all communicatively coupled to a core network 107. UE 101 communicates with base station 103 over a carrier 106, and communicates with base station 105 over a carrier 108.

In some examples, wireless system 100 can be a NR system, a LTE system, a 5G system, or some other wireless system. Even though many examples are described herein in the context of a NR system, wireless system 100 is not limited to a NR system. Instead, wireless system can be any wireless system where a UE transmits a CG PUSCH including an UCI without transmitting a PUCCH, or performs other functions described in this disclosure. There can be other network entities, e.g., network controller, a relay station, not shown. Wireless system 100 can support a wide range of use cases such as enhanced mobile broad band (eMBB), massive machine type communications (mMTC), ultra-reliable and low-latency communications (URLLC), and enhanced vehicle to anything communications (eV2X).

According to some aspects, base station 103 and base station 105 can be a fixed station or a mobile station. Base station 103 and base station 105 can also be called other names, such as a base transceiver system (BTS), an access point (AP), a transmission/reception point (TRP), an evolved NodeB (eNB), a next generation node B (gNB), a 5G node B (NB), or some other equivalent terminology. In some examples, base station 103 and base station 105 can be interconnected to one another and/or to other base station or network nodes in a network through various types of backhaul interfaces such as a direct physical connection, a virtual network, and/or the like, not shown.

According to some aspects, UE 101 can be stationary or mobile. UE 101 can be a cellular phone (e.g., a smart phone), a personal digital assistant (PDA), a wireless modem, a wireless communication device, a handheld device, a laptop, a desktop, a cordless phone, a wireless local loop station, a tablet, a camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufacturing equipment, a global positioning system device, an Internet-of-Things (IoT) device, a machine-type communication (MTC) device, an evolved or enhanced machine-type communication (eMTC) device, or any other suitable device that is configured to communicate via a wireless medium. For example, a MTC and eMTC device can include, a robot, a drone, a location tag, and/or the like.

According to some aspects, base station 103 and base station 105 can be communicatively coupled to core network 107. Base station 103 can serve a cell 102, while base station 105 can serve a cell 104 contained within cell 102. In some other embodiments, cell 102 can overlap partially with cell 104. Cell 102 or cell 104 can be a macro cell, a pico cell, a femto cell, and/or another type of cell. In comparison, a macro cell can cover a relatively large geographic area, e.g., several kilometers in radius, a femto cell can cover a relatively small geographic area, e.g., a home, while a pico cell covers an area smaller than the area covered by a macro cell but larger than the area covered by a femto cell. For example, cell 102 can be a macro cell, while cell 104 can be a pico cell or a femto cell. In addition, cell 102 can be a pico cell and cell 104 can be a femto cell. In some examples, the geographic area of a cell can move according to the location of a mobile base station.

According to some aspects, base station 103 can be the serving base station and cell 102 can be the serving cell or primary cell. Cell 104 can be a secondary cell. There can be other secondary cells for UE 101, not shown. Data for UE 101 can be simultaneously transferred between UE 101 and core network 107 by a radio connection between UE 101 and base station 103 at one carrier frequency (component carrier, e.g., carrier 106), and one or more radio connections between UE 101 and base station 105 at different carrier frequencies (component carriers, e.g., carrier 108).

According to some aspects, UE 101 can include a processor 109 to operate a protocol stack including multiple protocol layers, e.g., a physical (PHY) layer 110, per the description provided herein. In detail, PHY 110 can include a PUCCH 111 configured to carry an UCI 113, a CG PUSCH 112 to carry data 114, and a DG PUSCH 115. In some examples, when CG PUSCH 112 and PUCCH 111 overlaps in time, and DG PUSCH 115 does not overlap with CG PUSCH 112 and PUCCH 111, UCI 113 can be multiplexed into CG PUSCH 112 so that CG PUSCH 112 can carry both data 114 and UCI 113 to be transmitted to base station 103. There can be multiple CG PUSCHs including CG PUSCH 112, with more details shown in FIG. 2.

In some examples, UCI 113 can include a hybrid automatic repeat request (HARQ) feedback, a channel state information (CSI), a scheduling request (SR), or other control information. PUCCH 111 can be in various format, e.g., a short PUCCH such as PUCCH format 0 and 2 that occupies 1 or 2 OFDM symbols, or a long PUCCH such as PUCCH format 1, 3 and 4 that occupies 4 to 14 OFDM symbols. PUCCH format 0 and 1 carry UCI payloads having 1 or 2 bits. Other PUCCH formats carry UCI payloads having more than 2 bits.

In some examples, data 114 may not be available. In such a case, if CG PUSCH 112 does not overlap with PUCCH 111, CG PUSCH 112 can be dropped or skipped without being transmitted to base station 103. On the other hand, if CG PUSCH 112 overlaps with PUCCH 111, and DG PUSCH 115 does not overlap with CG PUSCH 112 and PUCCH 111, UCI 113 can be transmitted in CG PUSCH 112 without data being transmitted at the same time. Accordingly, PUCCH 111 can be skipped without being transmitted.

In some other examples, when data 114 is not available, CG PUSCH 112 overlaps with PUCCH 111, and DG PUSCH 115 overlaps with CG PUSCH 112 and PUCCH 111, UCI 113 can be transmitted in DG PUSCH 115. Accordingly, both PUCCH 111 and CG PUSCH 112 can be skipped without being transmitted.

FIG. 2 illustrates a block diagram of UE 101, having antenna panel 217 including one or more antenna elements, e.g., an antenna element 219 coupled to transceiver 203 and controlled by processor 109. In detail, transceiver 203 can include radio frequency (RF) circuitry 216, baseband transmission circuitry 212, and baseband reception circuitry 214. RF circuitry 216 can include multiple parallel RF chains for one or more of transmit or receive functions, each connected to one or more antenna elements of the antenna panel. In addition, processor 109 can be communicatively coupled to a memory device 201, which are further coupled to the transceiver 203. Processor 109, alone or in combination with instructions in memory device 201 and transceiver 203, can perform or cause to per perform, transmissions of a configured grant PUSCH including an UCI functionality as described herein.

According to some aspects, memory device 201 can store information about a protocol stack, which can include PHY 110, a MAC layer 220, a RRC layer 230, or more. PHY 110 can include PUCCH 111 configured to carry UCI 113, CG PUSCH 112 to carry data 114, DG PUSCH 115, and a configuration 211 received from base station 103. MAC layer 220 can include a logical channel (LCH) 221 that generates data 223, e.g., MAC protocol data unit (PDU), and a LCH 222 that generates data 224.

According to some aspects, based on configuration 211, processor 109 can determine a first set of CG PUSCHs 213. Each CG PUSCH of the first set of CG PUSCHs 213 overlaps with PUCCH 111, and is configured to transmit data from UE 101 to base station 103. Data can be generated by MAC layer 220, e.g., data 223 or data 224. In some examples, the first set of CG PUSCHs 213 can include a CG type 1 PUSCH based on the configuration provided by RRC configuration signaling, or a CG type 2 PUSCH based on the configuration provided by a physical downlink control channel (PDCCH). In case of a CG PUSCH with repetitions (either repetition Type A or Type B), each CG PUSCH repetition can be considered as a separate CG PUSCH. Similarly, for a CG PUSCH in NR unlicensed band (NR-U), each of multiple CG PUSCHs that is configured in one or multiple slots, can be considered separately.

Processor 109 can further determine a second set of CG PUSCHs 215 by excluding a third set of CG PUSCHs from the first set of CG PUSCHs 213. In some examples, if a CG PUSCH includes a symbol colliding with a semi-static downlink (DL) symbol, the CG PUSCH can be excluded from the first set of CG PUSCHs 213. If a CG PUSCH including a symbol colliding with a semi-static downlink (DL) symbol, the CG PUSCH would not be transmitted, and cannot be used to carry UCI 113 to base station 103. Similarly, if a CG PUSCH includes a symbol colliding with a DL symbol as indicated by a dynamic DCI, or a flexible symbol indicated by a slot format indicator, the CG PUSCH can be excluded from the first set of CG PUSCHs 213. In some other examples, the third set of CG PUSCHs can be an empty set, and no CG PUSCH is excluded from being considered as a candidate to carry UCI 113. However, if a CG PUSCH is selected to carry UCI 113, but the selected CG PUSCH collides with a DL symbol, the selected CG PUSCH can be dropped Accordingly, UCI 113 is dropped as well, which may cause efficiency and reliability issue to UE 101 and base station 103.

Afterwards, processor 109 can select a CG PUSCH from the second set of CG PUSCHs 215 to carry UCI 113 contained in PUCCH 111. The selected CG PUSCH is shown as CG PUSCH 112. In some examples, the multiple CG PUSCHs of the second set of CG PUSCHs 215 can correspond to the same serving cell, and possibly starting at the same time. CG PUSCH 112 can be selected from the second set of CG PUSCHs 215 based on an index of CG PUSCH 112, a logical channel priority for data mapped to CG PUSCH 112, a transmission duration of CG PUSCH 112, or a starting time of CG PUSCH 112. For example, CG PUSCH 112 can have a smallest index of each CG PUSCH of the second set of CG PUSCHs 215. Additionally and alternatively. CG PUSCH 112 may have a highest logical channel priority for data mapped to each CG PUSCH of the second set of CG PUSCHs 215, a shortest transmission duration of each CG PUSCH of the second set of CG PUSCHs 215, or an earlier starting time. The combination of the above alternatives may also be used. The above examples are provided for the purpose of illustration only and do not limit the disclosed aspects. For example, CG PUSCH 112 can have a biggest index, a lowest logical channel priority, or a longest transmission duration of each CG PUSCH of the second set of CG PUSCHs 215.

In some other examples, processor 109 can operate MAC layer 220 to select CG PUSCH 112 from the second set of CG PUSCHs 215 based on data availability and prioritization. Initially PHY 110 does not make the decision on which one of the second set of CG PUSCHs 215 is used for UCI multiplexing. Instead, PHY 110 indicates to MAC layer 220 to make such a decision. MAC layer 220 does prioritization and delivers the selected CG PUSCH 112 to PHY 110 together with data, e.g., data 223 or data 224. PHY 110 receives data for the selected CG PUSCH 112 from MAC layer 220, and further multiplex UCI 113 on the selected CG PUSCH 112. If PHY 110 does not receive any data for any CG PUSCH of the second set of CG PUSCHs 215, UCI can be dropped or transmitted on PUCCH 111. Additionally and alternatively, a combination of rules can be applied to select CG PUSCH 112 from the second set of CG PUSCHs 215. For example, UE 101 can first choose the CG PUSCH(s) with the earliest starting time, and then rely on MAC layer 220 to choose one if there are multiple CG PUSCH with the earliest starting time.

According to some aspects, in order to have the selected CG PUSCH 112 to transmit UCI 113, processor 109 can further determine that no DG PUSCH overlaps with PUCCH 111 or with the selected CG PUSCH 112. For example, processor 109 can further determine DG PUSCH 115 does not overlap with PUCCH 111 or with the selected CG PUSCH 112. As shown in FIG. 3A, PUCCH 111 is within a time interval [T1, T2], CG PUSCH 112 is within a time interval [T3, T4], and DG PUSCH 115 is within a time interval [T5, T6]. The time interval [T1, T2] overlaps with time interval [T3, T4], while both [T1. T2] and [T3, T4] have no overlap with [T5, T6].

Additionally and alternatively, when DG PUSCH 115 overlaps with CG PUSCH 112 but not PUCCH 111, the UE expects the DCI 301 for DG PUSCH 115 to be received at a time instance separated from the earlier of a starting point of PUCCH 111 and a starting point of CG PUSCH 112 by a predetermined time interval. This predetermined time interval is intended to provide UE sufficient time to make UCI multiplexing decision and process it. As shown in FIG. 3B, PUCCH 111 is within a time interval [T1, T2], CG PUSCH 112 is within a time interval [T3, T4], and DG PUSCH 115 is within a time interval [T7, T8]. The time interval [T1, T2] overlaps with time interval [T3, T4]. In addition, time interval [T7, T8] overlaps with time interval [T3, T4]. DG PUSCH 115 is configured by DCI 301, which is received at time instance T9. The time distance between T9 and T3, which is the starting point of CG PUSCH 112, is I1. If I1 is bigger than a predetermined value, the UE can choose DG PUSCH 115 over CG PUSCH 112 for data prioritization, and CG PUSCH 112 will be dropped, and UCI 113 is still transmitted using PUCCH 111 because it does not overlap with DG PUSCH 115. Alternatively, the UE may still choose to multiplex UCI 113 on CG PUSCH 112, and UCI 113 is dropped together with CG PUSCH 112.

On the other hand, if I1 is smaller than a predetermined value, UE 101 may treat it as an error. CG PUSCH 112 can still be selected and transmitted with multiplexed UCI 113. In this case, DG PUSCH 115 can be treated as an error. UE 101 does not expect to be scheduled with DG PUSCH 115 that overlaps with CG PUSCH 112 on the same serving cell if CG PUSCH 112 has UCI 113 multiplexed on it.

According to some aspects, the selected CG PUSCH 112 can carry UCI 113 of PUCCH 111. In addition, CG PUSCH 112 can carry data generated by a LCH, e.g., LCH 221 or LCH 222, of MAC layer 220 to be transmitted to base station 103. In some examples, data is selected from a LCH of MAC layer 220 when a preconfigured condition for mapping the LCH to the selected CG PUSCH 112 is met.

In some examples, data from a LCH can be mapped to CG PUSCH 112 if the following conditions are met: (1) the set of allowed subcarrier spacing index (SCS) values in allowedSCS-List, if configured, includes the subcarrier spacing index associated with CG PUSCH 112: (2) max-PUSCH-duration, if configured, is larger than or equal to the PUSCH transmission duration associated with CG PUSCH 112; (3) configuredGrantTypelAllowed, if configured, is set to true in case CG PUSCH 112 is a configured grant Type 1; (4) allowedServingCells, if configured, includes the cell information associated with CG PUSCH 112; (5) allowedCG-List, if configured, includes the configured grant index associated with CG PUSCH 112; (6) allowedPHY-PriorityIndex, if configured, includes the priority index associated with CG PUSCH 112.

In some other examples, when there is no data from a LCH that meets all the conditions to map the data to CG PUSCH 112, MAC layer 220 can generate padding, e.g., empty MAC PDU, for CG PUSCH 112 to be multiplexed with UCI 113. UE 101 can transmit CG PUSCH 112 carrying UCI 113 together with padding. However, padding can result in resource inefficiency, unnecessary UE power consumption and unnecessary interference.

In some other examples, data can be selected from a LCH of MAC layer 220 without meeting a preconfigured condition for mapping the LCH to the selected CG PUSCH 112. For example, the LCH of MAC layer 220 does not meet the preconfigured condition on an allowed subcarrier spacing index value, on a PUSCH transmission duration, on a configured grant type, on a cell information, on a configured grant index, or on a priority index. UE 101 or base station 103 can decide which preconfigured condition can be waived so that the LCH of MAC layer 220 that does not meet the waived preconfigured condition can be mapped to CG PUSCH 112.

In addition, the above principle of mapping data generated by a LCH of MAC layer 220 can be applied to a DG PUSCH as well. For example, if a DG PUSCH is selected to carry UCI 113 from PUCCH 111, data can be selected to be included in the DG PUSCH to be multiplexed with UCI 113. Initially, data from a LCH can be mapped to the DG PUSCH if certain preconfigured conditions are met. If no such data available meeting all the preconfigured condition, one or more conditions can be waived so that data can be selected to be carried in the DG PUSCH and multiplexed with UCI 113.

According to some aspects, processor 109 can be further configured to transmit CG PUSCH 112 including UCI 113, and possibly the data generated by the LCH. Hence, UCI 113 is multiplexed with data from a LCH satisfying preconfigured conditions, or from a LCH that does not meet a preconfigured condition. Accordingly, PUCCH 111 can be skipped without being transmitted to base station 103.

Figure 4:
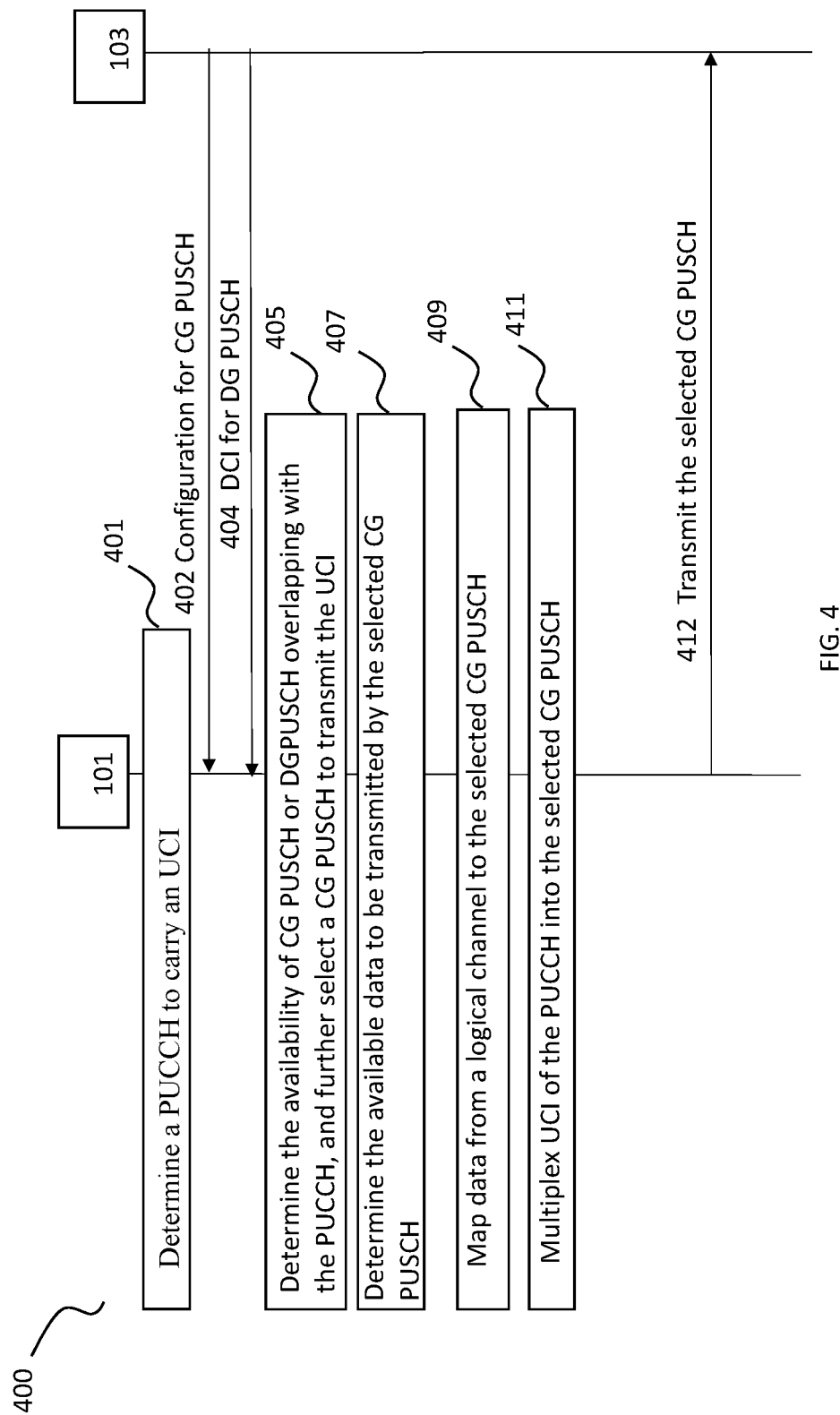
FIG. 4 illustrates an example method performed by a UE and a base station to transmit a configured grant PUSCH including an UCI without transmitting a PUCCH, according to some aspects of the disclosure.

FIG. 4 illustrates an example method 400 performed by UE 101 and base station 103 to transmit a CG PUSCH including an UCI without transmitting a PUCCH, according to some aspects of the disclosure. Method 400 can be performed by UE 101 and base station 103, as shown in FIGS. 1-3.

At 401, UE 101 can identify a PUCCH configured to carry an UCI. For example, UE 101 can identify that PUCCH 111 is configured to carry UCI 113.

At 402, UE 101 can receive a configuration from a base station for configuring CG PUSCHs. For example, UE 101 can receive configuration 211 from base station 103 for configuring the first set of CG PUSCHs 213.

At 404, UE 101 can receive a DCI from base station 103 for configuring a DG PUSCH. For example, UE 101 can receive DCI 301 from base station 103 for configuring DG PUSCH 115.

Figure 5:
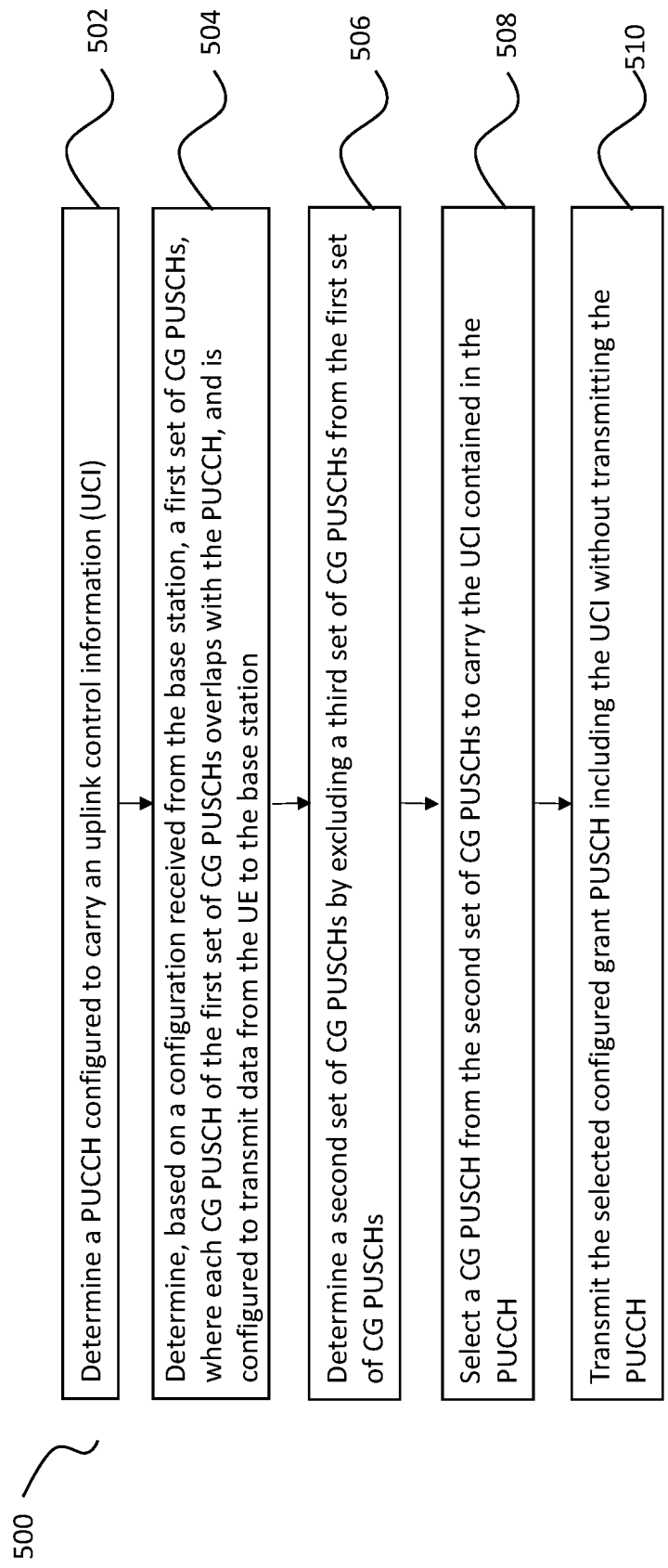
FIG. 5 illustrates an example method performed by a UE to transmit a configured grant PUSCH including an UCI without transmitting a PUCCH, according to some aspects of the disclosure.

At 405, UE 101 can determine, based on the configuration or DCI received from the base station, any available CG PUSCHs or DGPUSCHs overlapping with the PUCCH, and further select a CG PUSCH to transmit the UCI. On the other hand, if the CG PUSCH does not overlap with the PUCCH, the CG PUSCH can be skipped. For example, UE 101 can determine that the first set of CG PUSCHs 215 includes CG PUSCHs overlapping with PUCCH 111, and further select CG PUSCH 112 to transmit UCI 113. Further details of operations at 405 are shown in FIG. 5.

At 407, UE 101 can determine available data to be transmitted by the selected CG PUSCH. For example, UE 101 can further determine whether there is any data available to be transmitted by the select CG PUSCH 112.

At 409, when data are available for transmission, UE 101 can map data from a logical channel to the selected CG PUSCH. For example, UE 101 can map data 223 from logical channel 221 to the selected CG PUSCH 112.

At 411, UE 101 can multiplex UCI of the PUCCH into the selected CG PUSCH. For example, UE 101 can multiplex UCI 113 of PUCCH 1 into the selected CG PUSCH 112.

At 412, UE 101 can transmit the selected CG PUSCH carrying the UCI of the PUCCH to the base station. For example, UE 101 can transmit the selected CG PUSCH 112 carrying UCI 113 of PUCCH 111 to base station 103.

FIG. 5 illustrates an example method 500 performed by a UE to transmit a CG PUSCH including an UCI without transmitting a PUCCH, according to some aspects of the disclosure. Method 500 can be performed by UE 101, as shown in FIGS. 1-2. Method 500 can be an example of detailed operations performed at 405 shown in FIG. 4.

At 502, UE 101 can determine a PUCCH configured to carry an UCI. For example, UE 101 can determine that PUCCH 111 is configured to carry UCI 113, similar to operations performed at 401.

At 504, UE 101 can determine, based on a configuration received from the base station, a first set of CG PUSCHs, where each CG PUSCH of the first set of CG PUSCHs overlaps with the PUCCH, and is configured to transmit data from the UE to the base station. For example, based on configuration 211, UE 101 can determine the first set of CG PUSCHs 213, where each CG PUSCH of the first set of CG PUSCHs 213 overlaps with PUCCH 111.

At 506, UE 101 can determine a second set of CG PUSCHs by excluding a third set of CG PUSCHs from the first set of configured grant PUSCHs. For example, UE 101 can determine the second set of CG PUSCHs 215 by excluding a third set of CG PUSCHs from the first set of CG PUSCHs 213. Various criteria can be applied to exclude a CG PUSCH from being considered to carry the UCI, e.g., to exclude a CG PUSCH that includes a symbol colliding with a semi-static downlink (DL) symbol, as described for FIGS. 1-2.

At 508, UE 101 can select a CG PUSCH from the second set of CG PUSCHs to carry the UCI contained in the PUCCH. For example, UE 101 can select CG PUSCH 112 from the second set of CG PUSCHs 215 to carry UCI 113 contained in the PUCCH 111. Various techniques can be applied to select the CG PUSCH from the second set of CG PUSCHs, e.g., based on an index of CG PUSCH, a logical channel priority for data mapped to CG PUSCH, or a transmission duration of CG PUSCH, as described for FIGS. 1-2.

At 510, UE 101 can transmit the selected CG PUSCH carrying the UCI of the PUCCH to the base station. For example, UE 101 can transmit the selected CG PUSCH 112 carrying UCI 113 of PUCCH 111 to base station 103.

Figure 6:
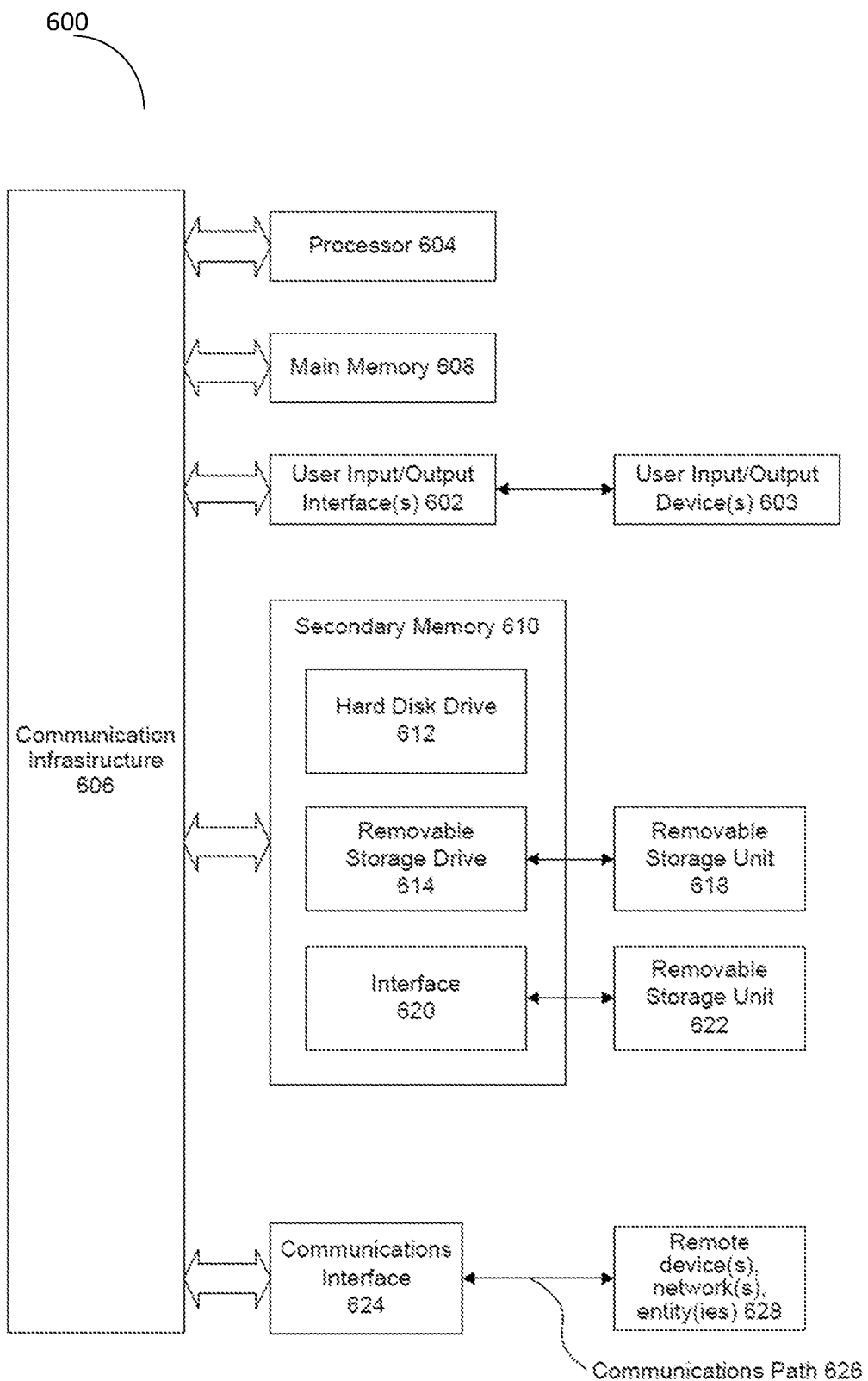
FIG. 6 is an example computer system for implementing some aspects or portion(s) thereof of the disclosure provided herein.

Various aspects can be implemented, for example, using one or more computer systems, such as computer system 600 shown in FIG. 6. Computer system 600 can be any computer capable of performing the functions described herein such as UE 101, base station 103, or base station 105 as shown in FIG. 1 and FIG. 2. Computer system 600 includes one or more processors (also called central processing units, or CPUs), such as a processor 604. Processor 604 is connected to a communication infrastructure 606 (e.g., a bus). Computer system 600 also includes user input/output device(s) 603, such as monitors, keyboards, pointing devices, etc., that communicate with communication infrastructure 606 through user input/output interface(s) 602. Computer system 600 also includes a main or primary memory 608, such as random access memory (RAM). Main memory 608 may include one or more levels of cache. Main memory 608 has stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to some aspects, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 608, the removable storage unit 618, the removable storage unit 622 can store instructions that, when executed by processor 604, cause processor 604 to perform operations for a UE or a base station, e.g., UE 101, base station 103, or base station 105 as shown in FIG. 1 and FIG. 2. In some examples, the operations include those operations illustrated and described in FIGS. 3-4.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626. Operations of the communication interface 624 can be performed by a wireless controller, and/or a cellular controller. The cellular controller can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 6. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments or examples, at least one of the components set forth in one or more of the preceding figures may be configured to perform one or more operations, techniques, processes, and/or methods as set forth in the example section below. For example, circuitry associated with a thread device, routers, network element, etc. as described above in connection with one or more of the preceding figures may be configured to operate in accordance with one or more of the examples set forth below in the example section.

What is claimed is:

1. A user equipment (UE), comprising:
a transceiver configured to wirelessly communicate with a base station; and
a processor communicatively coupled to the transceiver and configured to:
identify a physical uplink control channel (PUCCH) configured to carry an uplink control information (UCI);
determine, based on a configuration received from the base station, a first set of configured grant physical uplink shared channels (PUSCHs), wherein each configured grant PUSCH of the first set of configured grant PUSCHs overlaps with the PUCCH, and is configured to transmit data from the UE to the base station;
determine a second set of configured grant PUSCHs by excluding a third set of configured grant PUSCHs from the first set of configured grant PUSCHs;
select a configured grant PUSCH from the second set of configured grant PUSCHs to carry the UCI contained in the PUCCH;
transmit the selected configured grant PUSCH including the UCI without transmitting the PUCCH; and
determine that there is no dynamic grant PUSCH overlapping with the PUCCH or with the selected configured grant PUSCH.

2. The UE of claim 1, wherein the first set of configured grant PUSCHs includes a configured grant type 1 PUSCH based on the configuration provided by radio resource control (RRC) configuration signaling, or a configured grant type 2 PUSCH based on the configuration provided by a physical downlink control channel (PDCCH).

3. The UE of claim 1, wherein the third set of configured grant PUSCHs excluded from the first set of configured grant PUSCHs comprises a configured grant PUSCH including a symbol colliding with a semi-static downlink (DL) symbol.

4. The UE of claim 3, wherein the third set of configured grant PUSCHs excluded from the first set of configured grant PUSCHs comprises a configured grant PUSCH including a symbol colliding with a DL symbol as indicated by a dynamic downlink control information (DCI) or as indicated by a flexible symbol indicated by a slot format indicator, or the configured grant PUSCH overlapping with a dynamic grant PUSCH configured by a downlink control information (DCI) received at a time instance separated from a starting point of the PUCCH by a predetermined time interval.

5. The UE of claim 1, wherein the processor is configured to select the configured grant PUSCH from the second set of configured grant PUSCHs based on an index of the configured grant PUSCH, a logical channel priority for data mapped to the configured grant PUSCH, a transmission duration of the configured grant PUSCH, a starting time of transmission for the configured grant PUSCH, or a serving cell of the configured grant PUSCH.

6. The UE of claim 5, wherein the processor is configured to select, from the second set of configured grant PUSCHs, the configured grant PUSCH that has a smallest index of each configured grant PUSCH, a highest logical channel priority for data mapped to each configured grant PUSCH, or a shortest transmission duration of each configured grant PUSCH.

7. The UE of claim 1, wherein the processor is configured to operate a medium access control (MAC) layer to select the configured grant PUSCH from the second set of configured grant PUSCHs.

8. The UE of claim 1, wherein the selected configured grant PUSCH further carries data generated by a logical channel (LCH) of a medium access control (MAC) layer to be transmitted to the base station.

9. The UE of claim 8, wherein the data is selected from the logical channel of the MAC layer without meeting a preconfigured condition for mapping the logical channel to the selected configured grant PUSCH.

10. The UE of claim 9, wherein the logical channel of the MAC layer does not meet the preconfigured condition on an allowed subcarrier spacing index value, on a PUSCH transmission duration, on a configured grant type, on a cell information, on a configured grant index, or on a priority index.

11. A method for a user equipment (UE), comprising:
    identifying a physical uplink control channel (PUCCH) configured to carry an uplink control information (UCI) to be transmitted to a base station;
    determining, based on a configuration received from the base station, a first set of configured grant physical uplink shared channels (PUSCHs), wherein each configured grant PUSCH of the first set of configured grant PUSCHs overlaps with the PUCCH, and is configured to transmit data from the UE to the base station;
    determining a second set of configured grant PUSCHs by excluding a third set of configured grant PUSCHs from the first set of configured grant PUSCHs;
    selecting a configured grant PUSCH from the second set of configured grant PUSCHs to carry the UCI contained in the PUCCH;
    transmitting the selected configured grant PUSCH including the UCI without transmitting the PUCCH; and
    determining that there is no dynamic grant PUSCH overlapping with the PUCCH or with the selected configured grant PUSCH.

12. The method of claim 11, wherein the third set of configured grant PUSCHs excluded from the first set of configured grant PUSCHs comprises a configured grant PUSCH including a symbol colliding with a semi-static downlink (DL) symbol, a DL symbol as indicated by a dynamic downlink control information (DCI), or a flexible symbol indicated by a slot format indicator.

13. The method of claim 11, wherein the selecting the configured grant PUSCH comprises selecting the configured grant PUSCH from the second set of configured grant PUSCHs based on an index of the configured grant PUSCH, a logical channel priority for data mapped to the configured grant PUSCH, or a transmission duration of the configured grant PUSCH.

14. The method of claim 11, wherein the selecting the configured grant PUSCH comprises operating a medium access control (MAC) layer to select the configured grant PUSCH from the second set of configured grant PUSCHs.

15. The method of claim 11, wherein the selected configured grant PUSCH further carries data generated by a logical channel (LCH) of a medium access control (MAC) layer to be transmitted to the base station.

16. A non-transitory computer-readable medium storing instructions that, when executed by a processor of a user equipment (UE), cause the UE to perform operations, the operations comprising:
    identifying a physical uplink control channel (PUCCH) configured to carry an uplink control information (UCI) to be transmitted to a base station;
    determining, based on a configuration received from the base station, a first set of configured grant physical uplink shared channels (PUSCHs), wherein each configured grant PUSCH of the first set of configured grant PUSCHs overlaps with the PUCCH, and is configured to transmit data from the UE to the base station;
    determining a second set of configured grant PUSCHs by excluding a third set of configured grant PUSCHs from the first set of configured grant PUSCHs;
    selecting a configured grant PUSCH from the second set of configured grant PUSCHs to carry the UCI contained in the PUCCH;
    transmitting the selected configured grant PUSCH including the UCI without transmitting the PUCCH; and
    determining that there is no dynamic grant PUSCH overlapping with the PUCCH or with the selected configured grant PUSCH.

\* \* \* \* \*